(12) United States Patent
Srinivasan et al.

(10) Patent No.: US 12,265,922 B1
(45) Date of Patent: Apr. 1, 2025

(54) SYSTEM AND METHOD FOR AUTOMATED SOFTWARE DEVELOPMENT THROUGH AI BASED AUTOMATED REQUIREMENTS

(71) Applicant: PrismX, Inc, Waltham, MA (US)

(72) Inventors: Venkat Srinivasan, Weston, MA (US); Anbu Rajunaidu, Sharon, MA (US); Nadeem Yunus, East Walpole, MA (US); Joy Dasgupta, Dover, MA (US)

( * ) Notice: Subject to any disclaimer, the term of this patent is extended or adjusted under 35 U.S.C. 154(b) by 111 days.

(21) Appl. No.: 17/530,638

(22) Filed: Nov. 19, 2021

Related U.S. Application Data

(60) Provisional application No. 63/116,407, filed on Nov. 20, 2020.

(51) Int. Cl.
*G06N 5/04* (2023.01)
*G06F 8/10* (2018.01)
*G06N 5/01* (2023.01)

(52) U.S. Cl.
CPC ............ *G06N 5/04* (2013.01); *G06F 8/10* (2013.01); *G06N 5/01* (2023.01)

(58) Field of Classification Search
CPC ............ G06N 5/01; G06N 5/04; G06F 8/10
See application file for complete search history.

(56) References Cited

U.S. PATENT DOCUMENTS

| | | | | |
|---|---|---|---|---|
| 2016/0071162 A1* | 3/2016 | Ogawa | ............... | G06Q 50/01 705/14.66 |
| 2019/0294428 A1* | 9/2019 | Scheiner | ............... | H04L 67/34 |
| 2021/0064361 A1* | 3/2021 | Jayaraman | ............ | G06N 20/10 |
| 2022/0091825 A1* | 3/2022 | Mohiseen | ................ | G06F 8/20 |
| 2022/0139075 A1* | 5/2022 | Xie | ...................... | G06V 10/774 382/159 |
| 2022/0206774 A1* | 6/2022 | Arora | ................... | G06F 9/5038 |

FOREIGN PATENT DOCUMENTS

WO  WO-2020133324 A1 * 7/2020

OTHER PUBLICATIONS

Junen Xue et al. "Method and Apparatuses for Artificial Intelligence Application Building Application Building and Operational Implementation and Machine Device". (Year: 2018).*

* cited by examiner

*Primary Examiner* — Ziaul A Chowdhury

(57) ABSTRACT

A system and method for an AI-based Automated Software Application Development Platform which intelligently gathers requirements from a business analyst and generates a runnable software application from those requirements. The AI-based platform enables the business analyst with no technical knowledge to visually model their requirements rapidly without requiring any programming Using the abstract requirements architecture and the platform, the analyst creates requirements models for the application's business processes and business tasks for each of the processes including defining the supporting information needs. The system intelligently assists the user in defining the information needs for each of the business processes and their tasks. Once the requirements models are created by the analyst with the help of the platform, the platform automatically designs and creates an appropriate persistent canonical data model for the application from the defined information needs. The platform then creates a runnable software application.

18 Claims, 21 Drawing Sheets

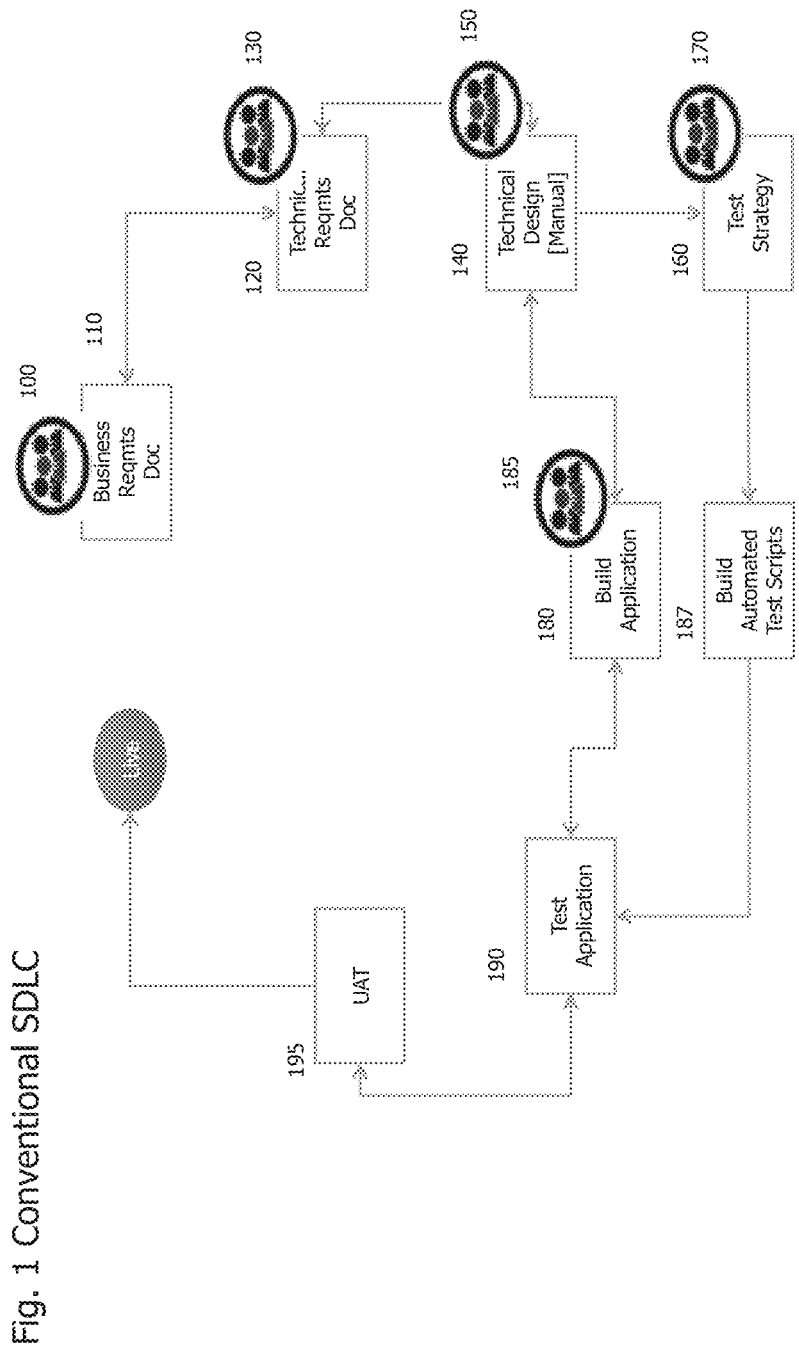
Fig. 1 Conventional SDLC

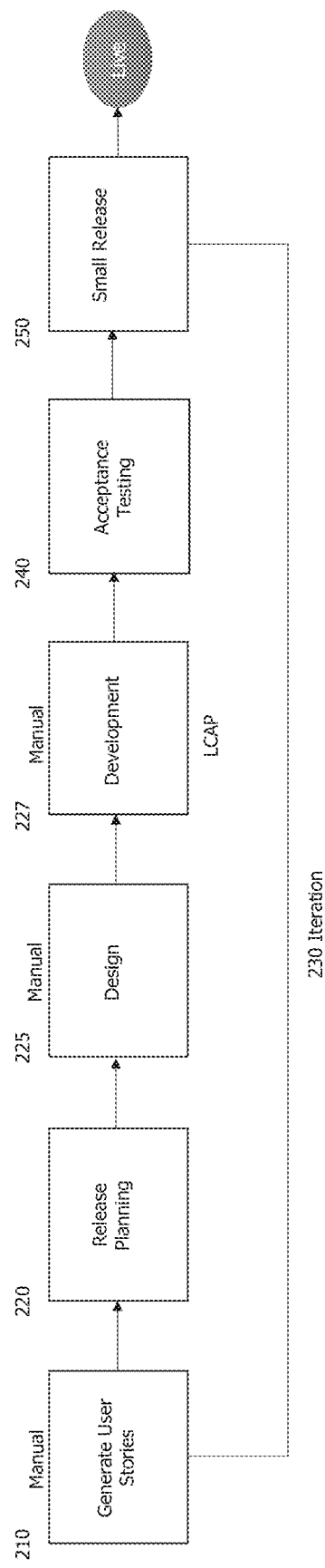
Fig. 2 Agile SDLC

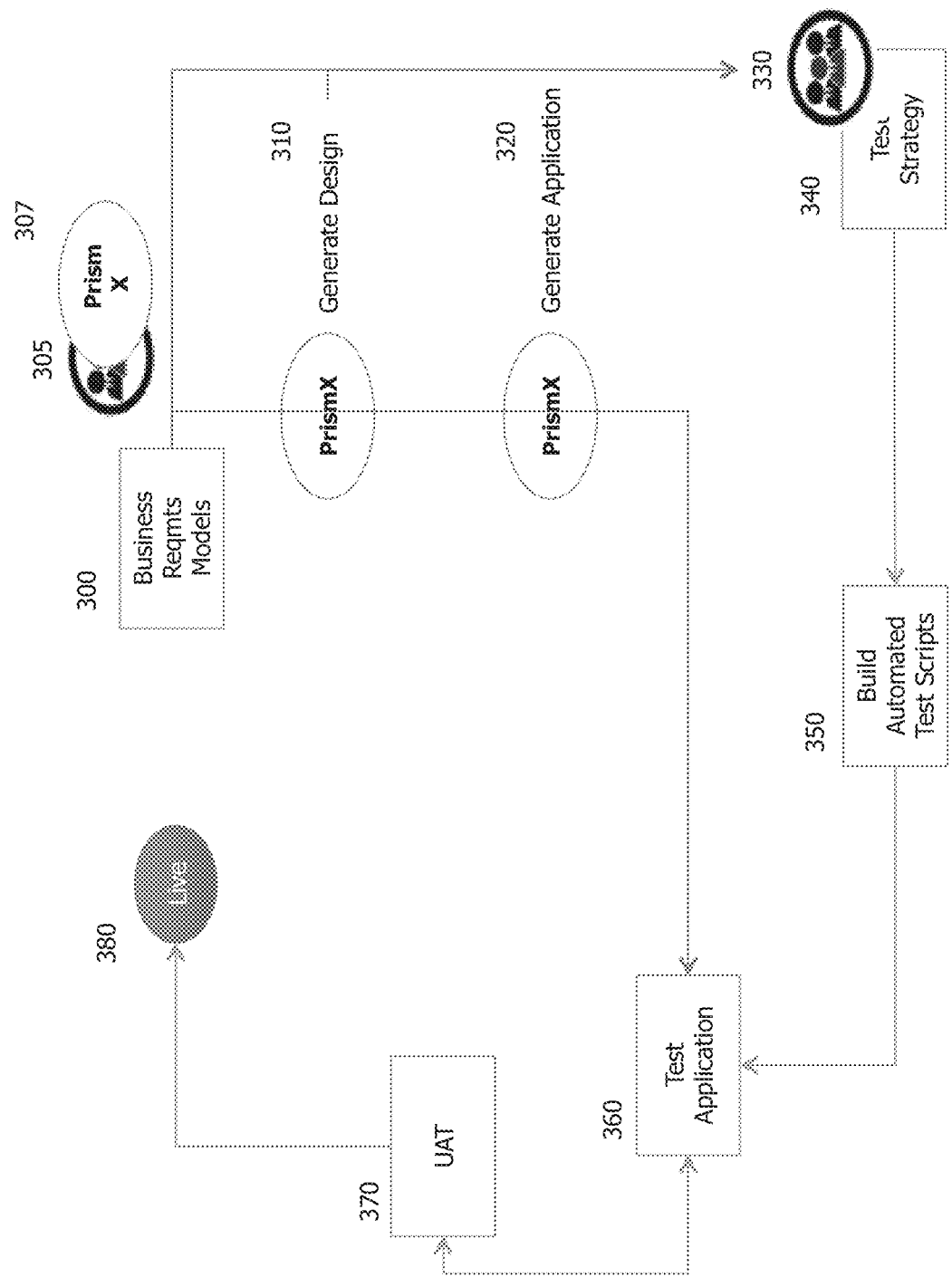
Fig. 3 PRISM SDLC

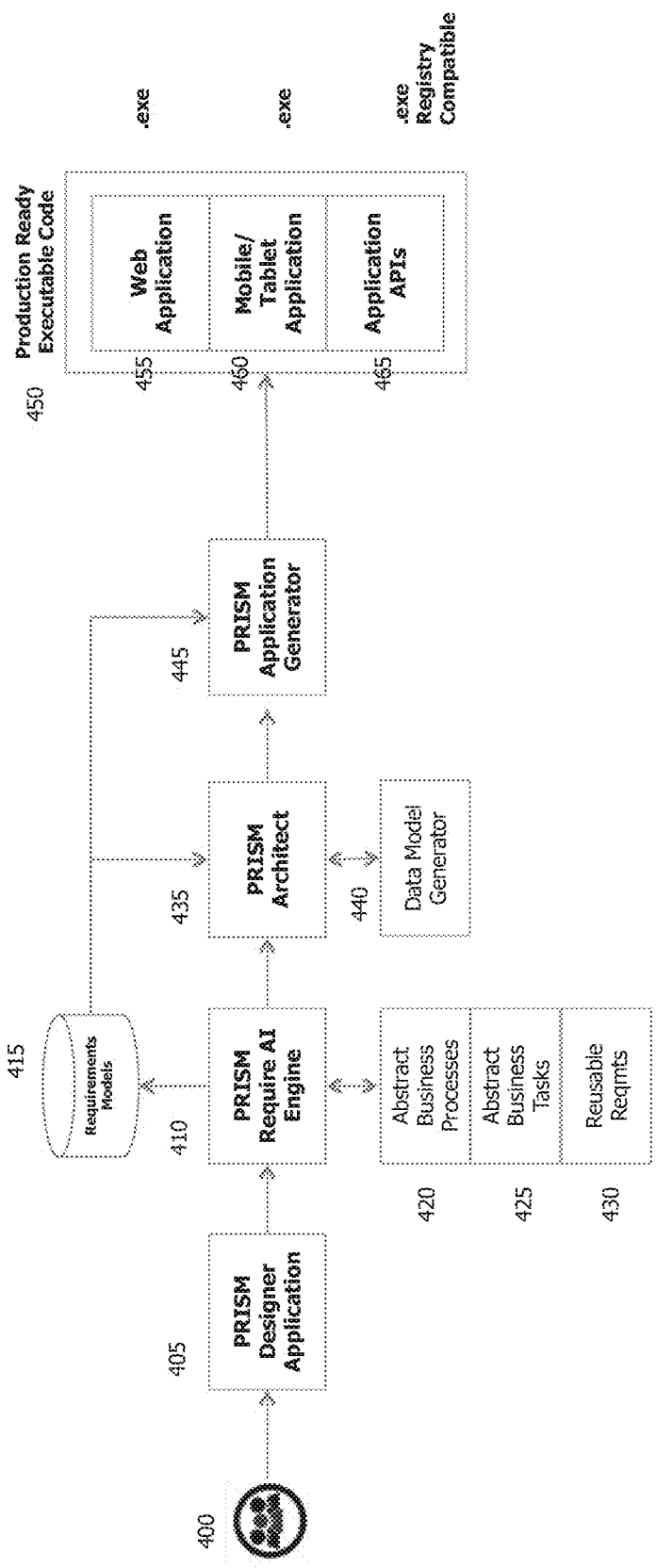

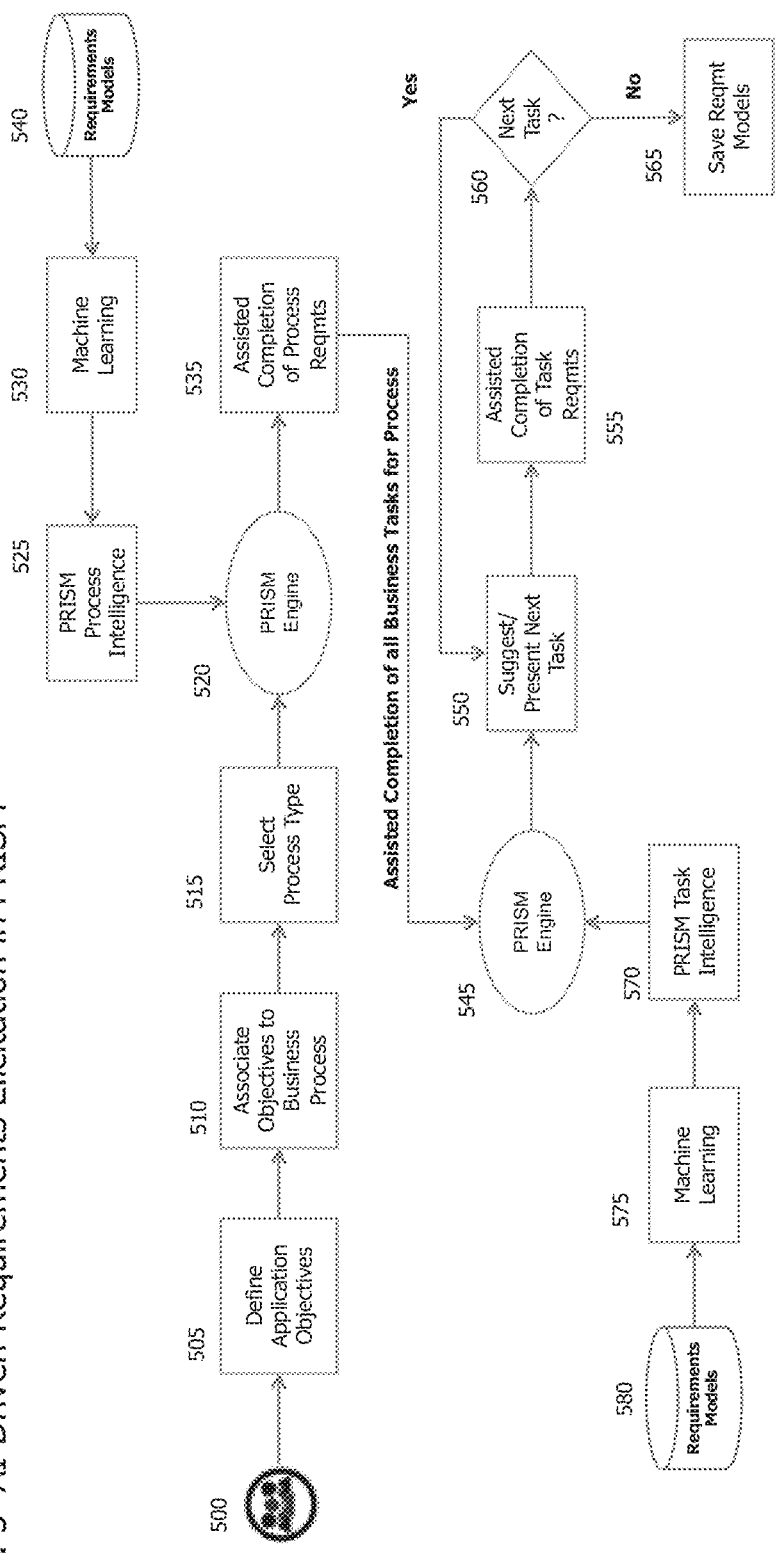
Fig. 5 AI-Driven Requirements Elicitation in PRISM

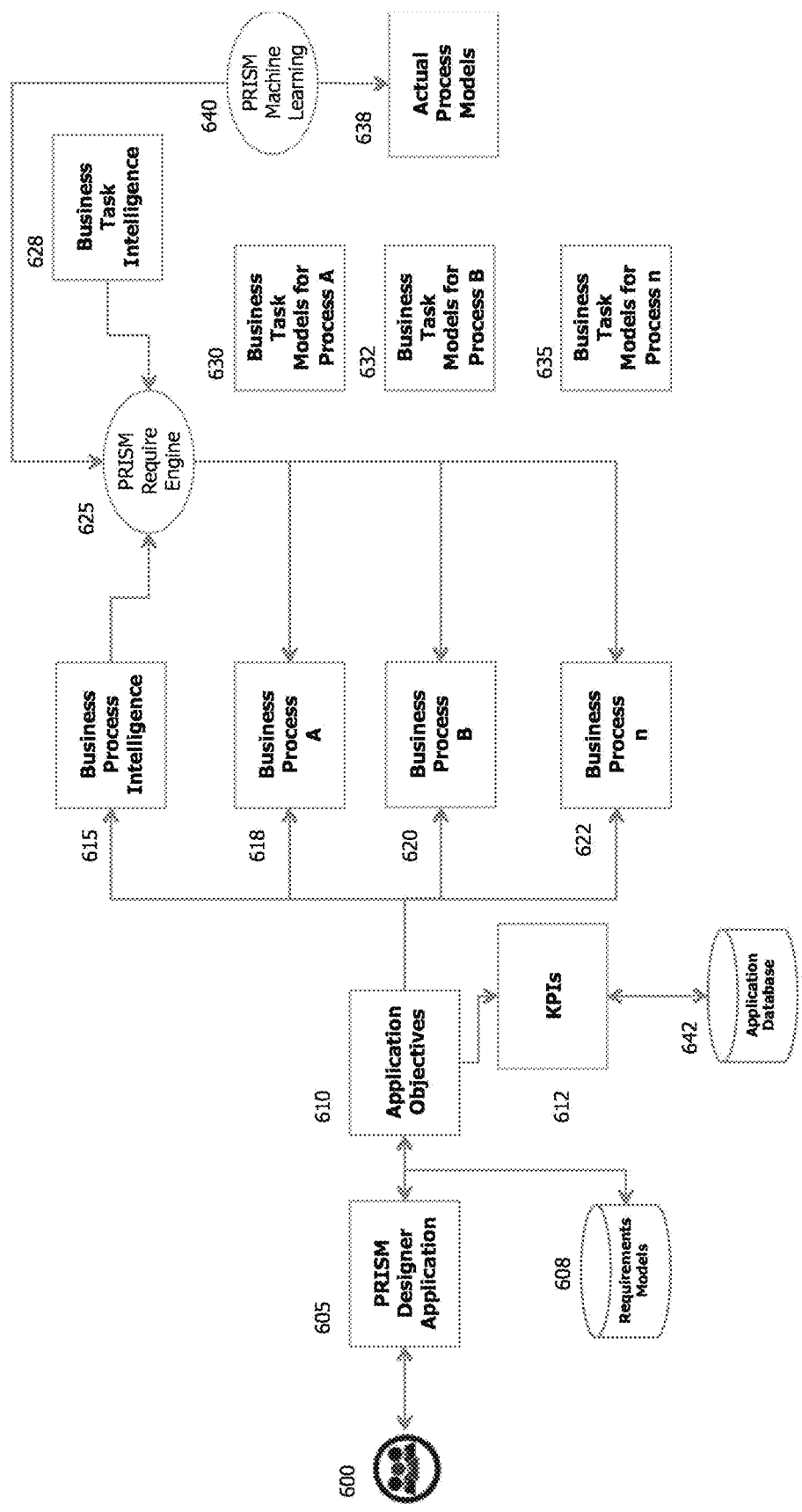
Fig. 6A PRISM Requirements Model – Application

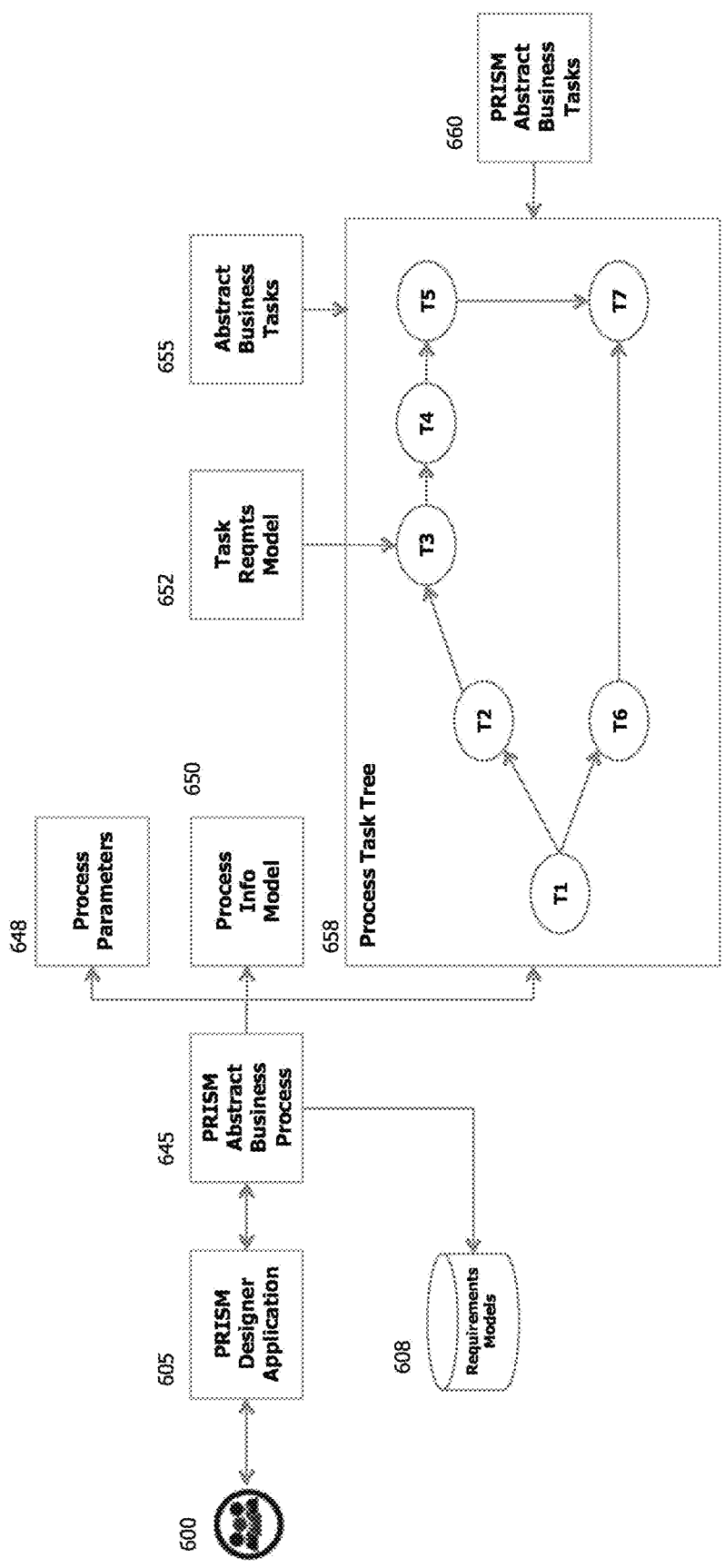
Fig. 6B PRISM Requirements Model – Business Process

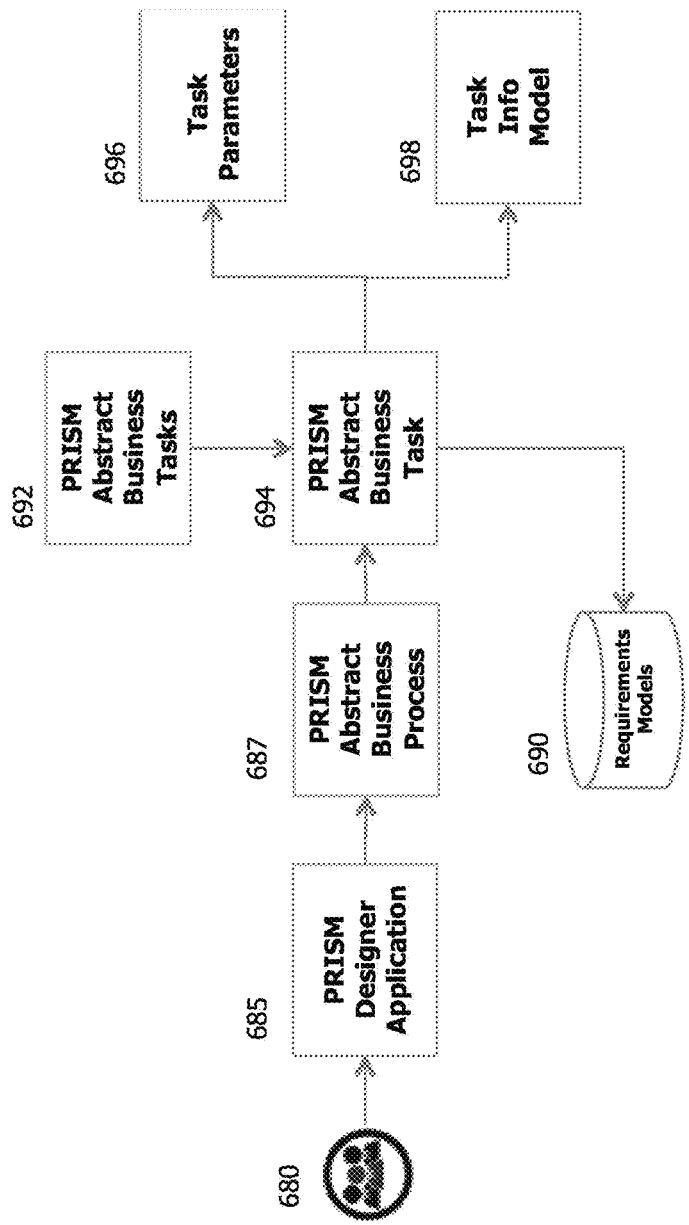
Fig. 6C PRISM Requirements Model – Business Task

Fig. 7 PRISM Abstract Business Task Components
700 Components
| | | |
|---|---|---|
| O | IM | Information Model |
| P | CO | Compute |
| CT | BR | Business Rule |
| DT | UI | User Interface |
| DB | EE | External Object |
| NLU | SML | Stat Machine Learning |
| OPT | EXT | Extractor |
| COL | APIs | Known APIs |
Objectives
Process
Connector
Decision Tree
Database
Natural Language Understanding
Optimization
Collections
710 Flow
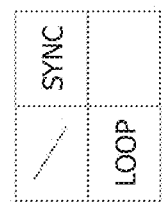
720 Drawing
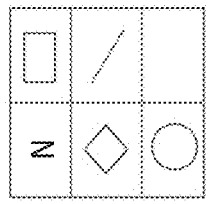

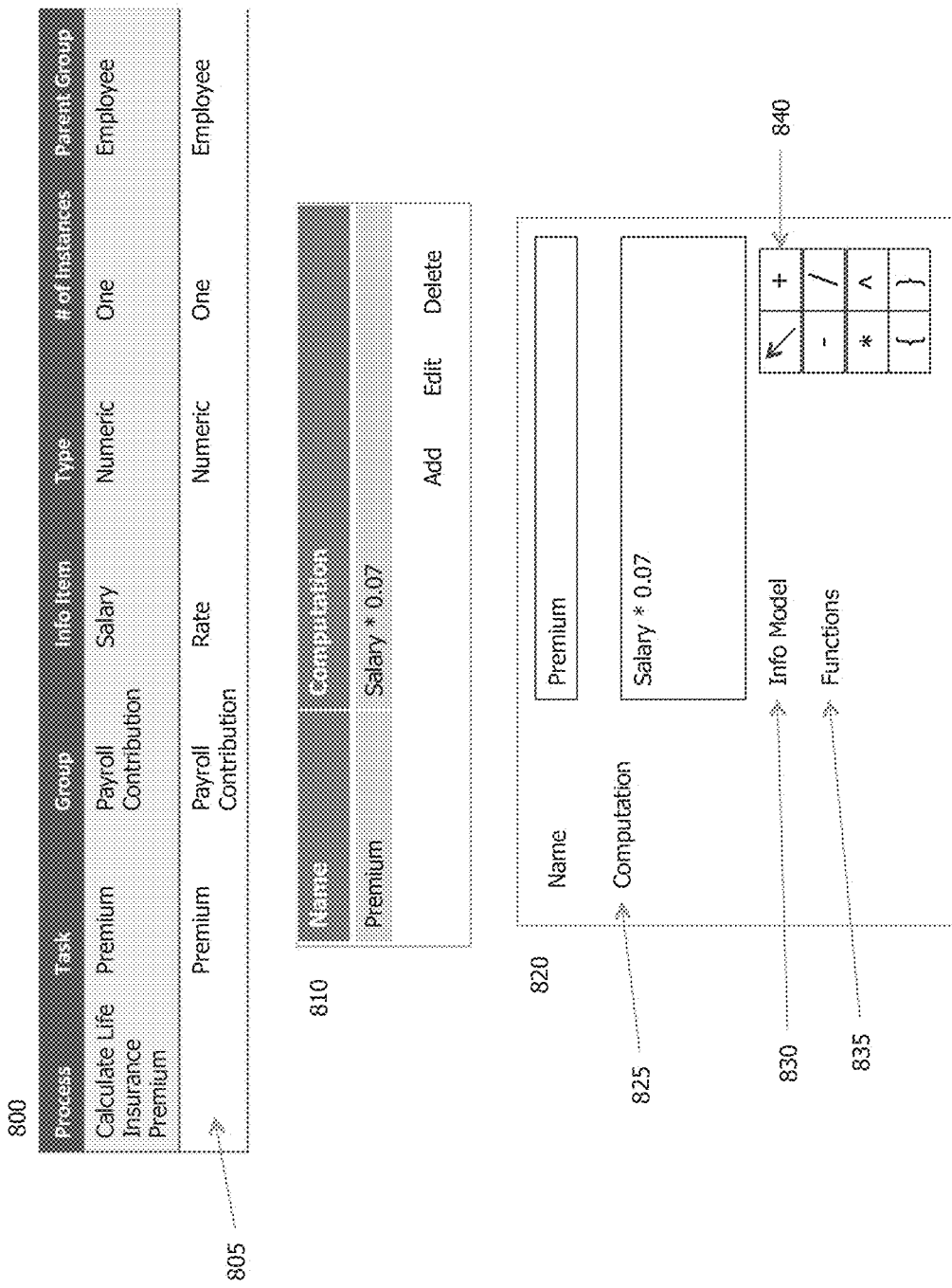
Fig. 8 PRISM Requirements Model Example – Compute Business Task

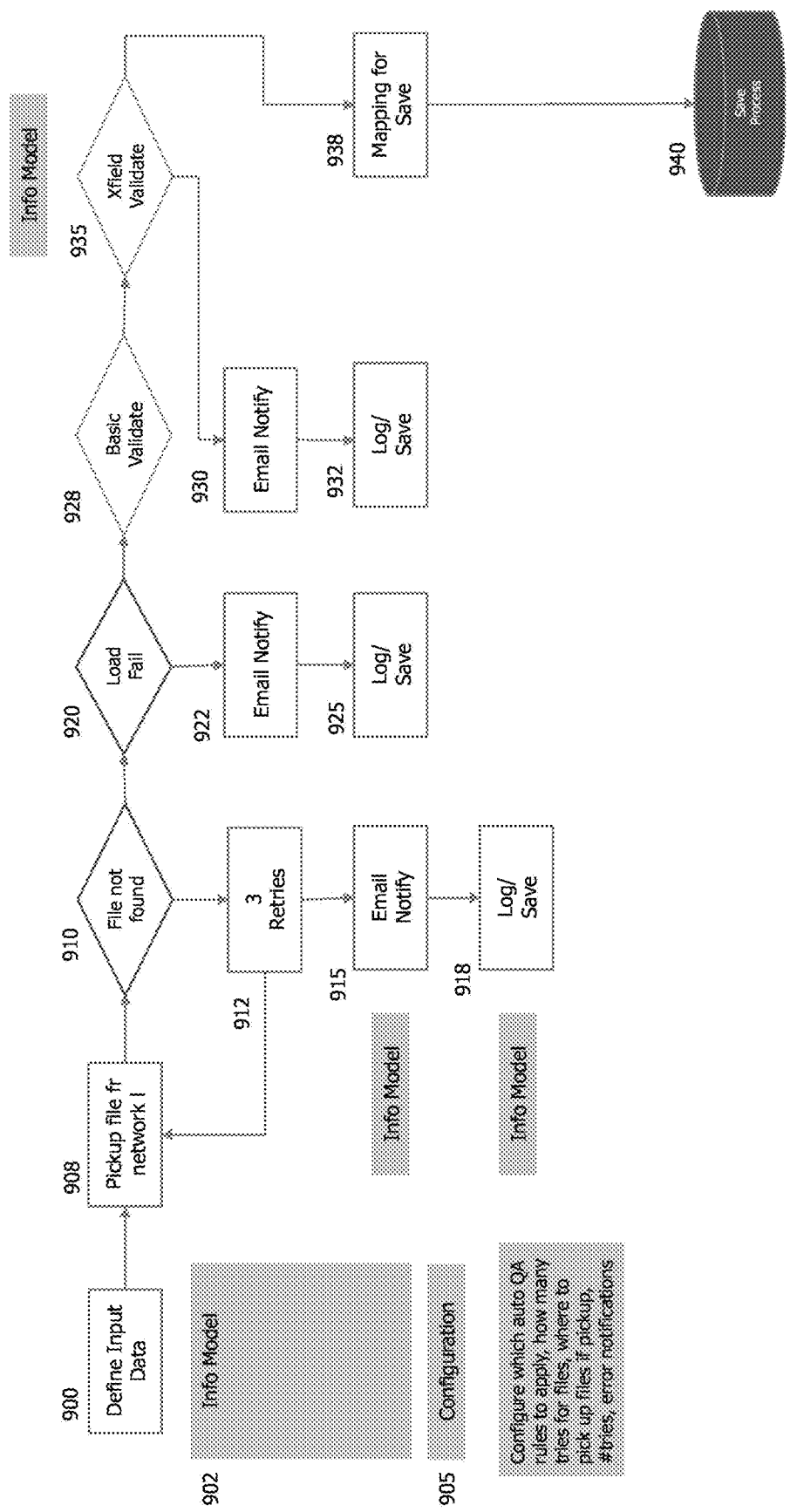
Fig. 9A Prism Requirement Model Example – Incoming Interface ?

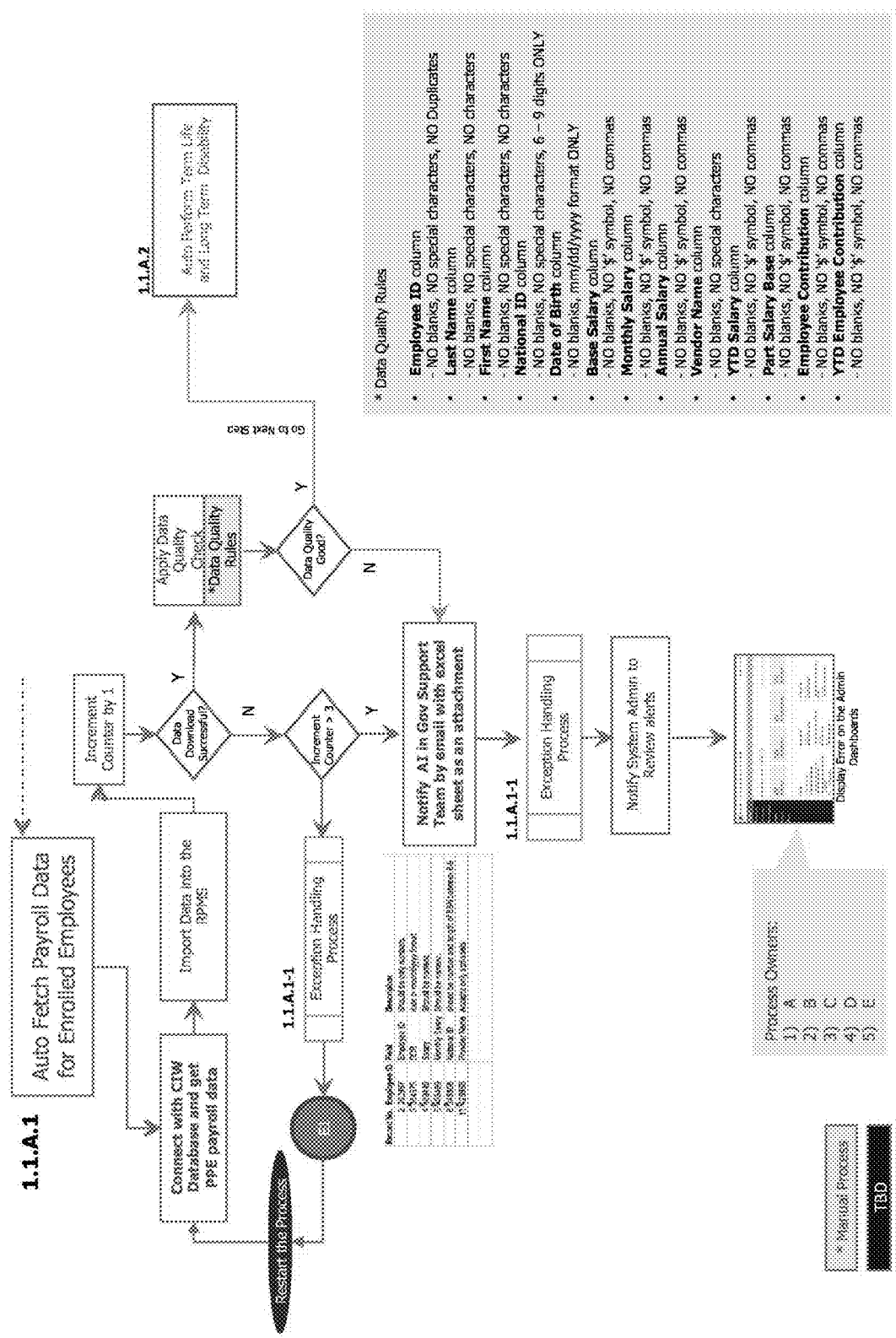
Fig. 9B PRISM Requirement Model Example – Incoming Interface

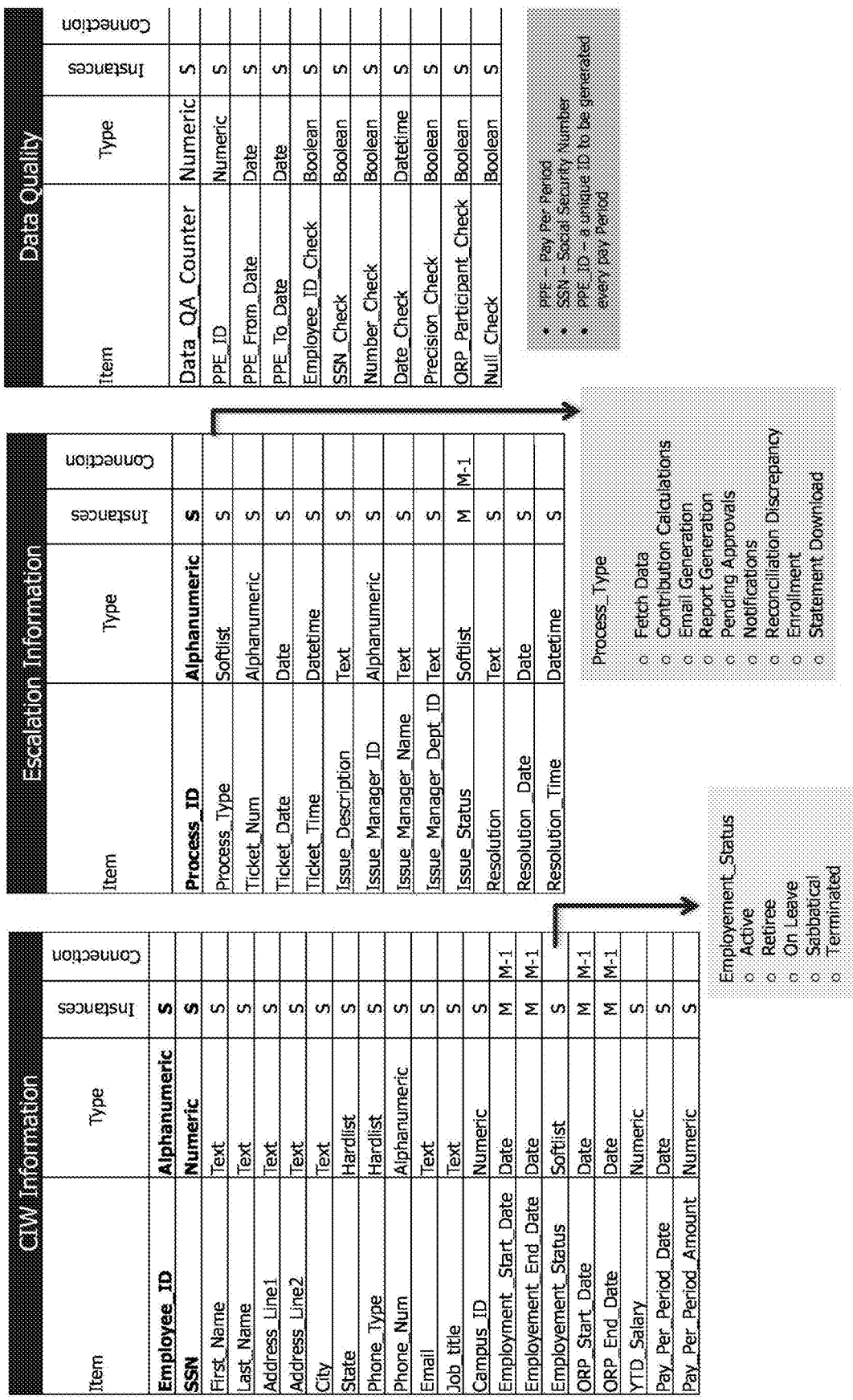
Fig. 9C Information Model for the Requirements Model Example

Fig. 10 Information Model

1000

Information Model Input:

| Process 1005 | Task 1010 | Group 1015 | Info Item 1020 | Type 1025 | # of Instances 1030 | Parent Group 1035 |
|---|---|---|---|---|---|---|

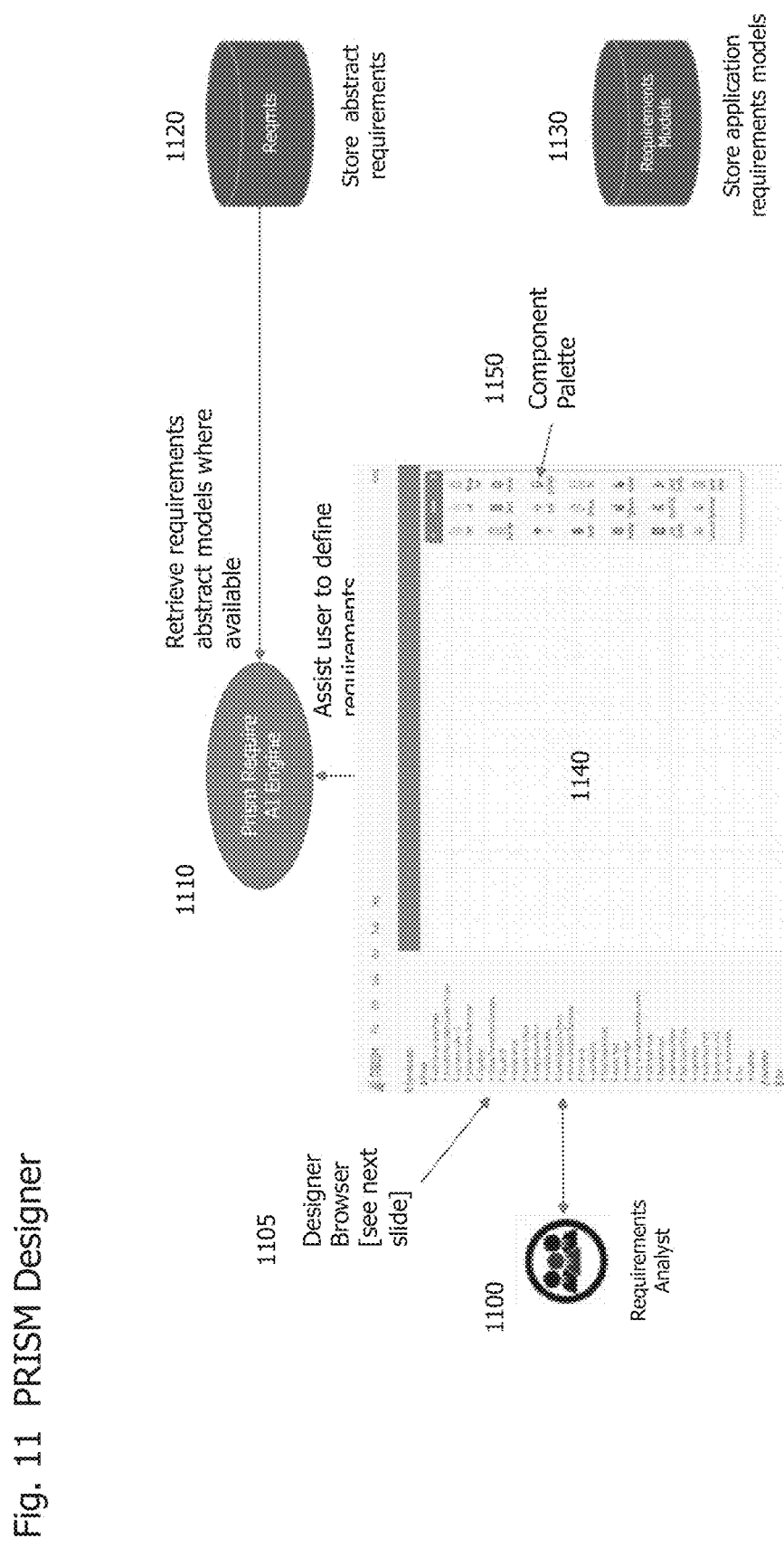
Fig. 11 PRISM Designer

Fig. 12A PRISM Abstract Business Process Types 1200    1205

| Type | Description |
|---|---|
| Transactional | An end to end transaction process; often the main process of an application; includes other process types |
| Computational | A process that takes input and computes intermediate values and then outputs input + computed values |
| Interface - File | Receives an input file, chunks it optionally, reads it into a temp table, applies quality checks, maps it to a target target optionally and saves processed data |
| Interface – Remote Data Access | Accesses a remote database, retrieve data, reads it into a temp table in memory or in a physical DB, applies quality checks, maps it to a target target optionally and saves processed data |
| User interaction - summary | Present a UI process with a screen for summary output from a single table; Select from a range of UI templates/themes |
| User interaction – simple input | Present a UI process with a screen for data intake from a single table; Select from a range of UI templates/themes; data validation already pre-defined on the basis of field types; provide a simple intelligent cross-field validation rule list |
| User interaction - combination | Summary process followed by optional add, edit which will trigger a simple input UI |
| User interaction – complex multi table | TBD |

Fig. 12B  PRISM Abstract Business Process Types

1200

| Type | Description |
|---|---|
| | 1205 |
| Reporting | A structured query retrieves data from 1 or more tables, presents it on a screen & optionally generates a PDF and mail |
| Queuing | Sort a work queue according to a defined rule(s), assign on the basis of user attributes & optionally availability |
| Logic Discovery | Define and point to input and output, provide threshold for iterative variables, define default logic sequence and iterate over the input to identify matches and exceptions; display matches with logic that matched + exceptions |
| Monitoring & Escalation | Monitor one or more variables or events, and have a system of escalation via the application and/or email, txt and other mediums |
| AI Extraction Train Model | Receive training documents, define data to be extracted, layout geometry |
| AI Extraction Production | Receive production document(s), name of model to be applied (if known) |
| AI Classifier Train | Receive training data/documents, define classification method, validation method (X validation etc), penalty function if applicable |
| AI Classification Production | Receive production data/document(s), name of model to be applied (if known) |

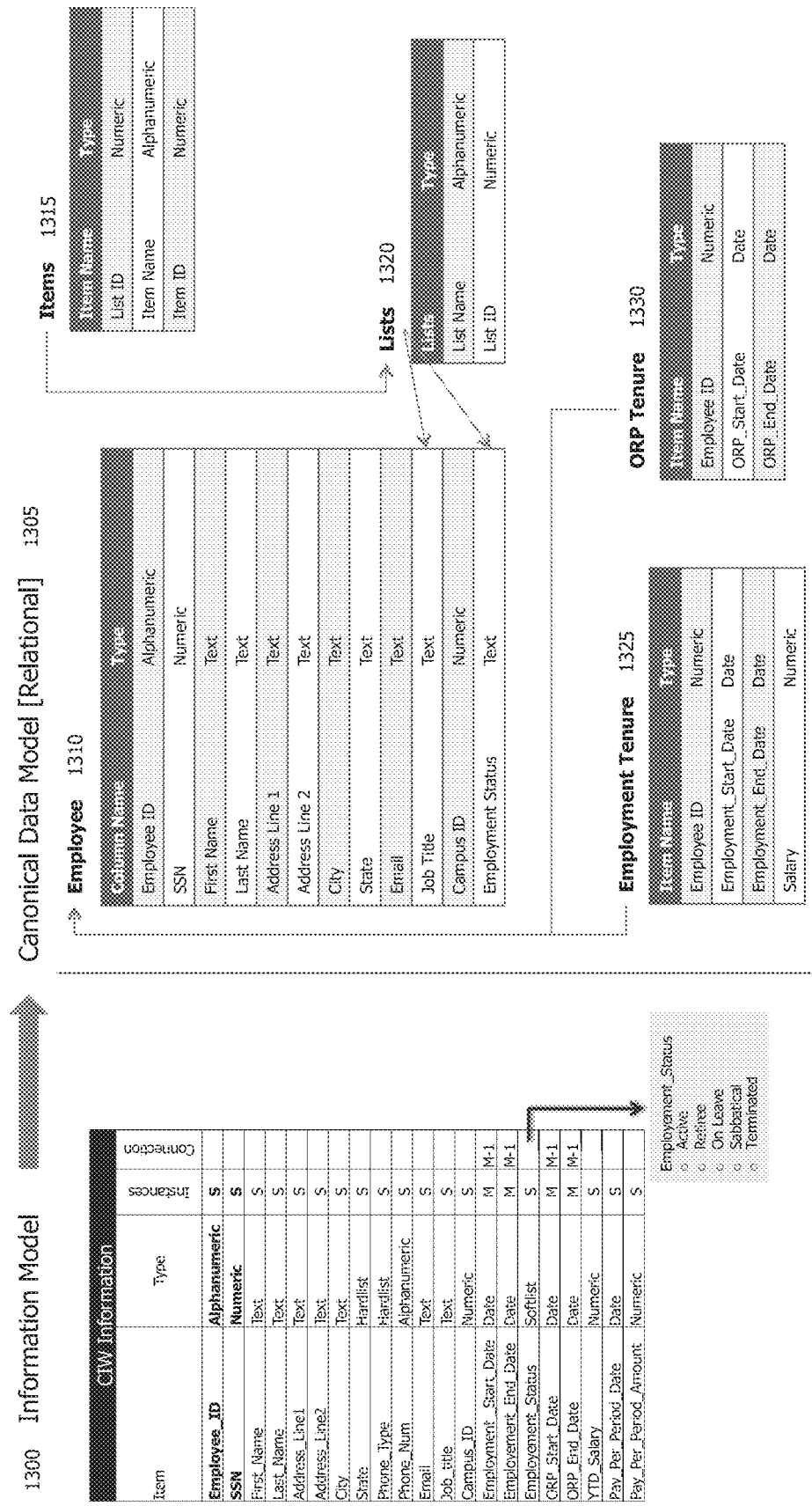
Fig. 13 PRISM Automated Data Model Generation

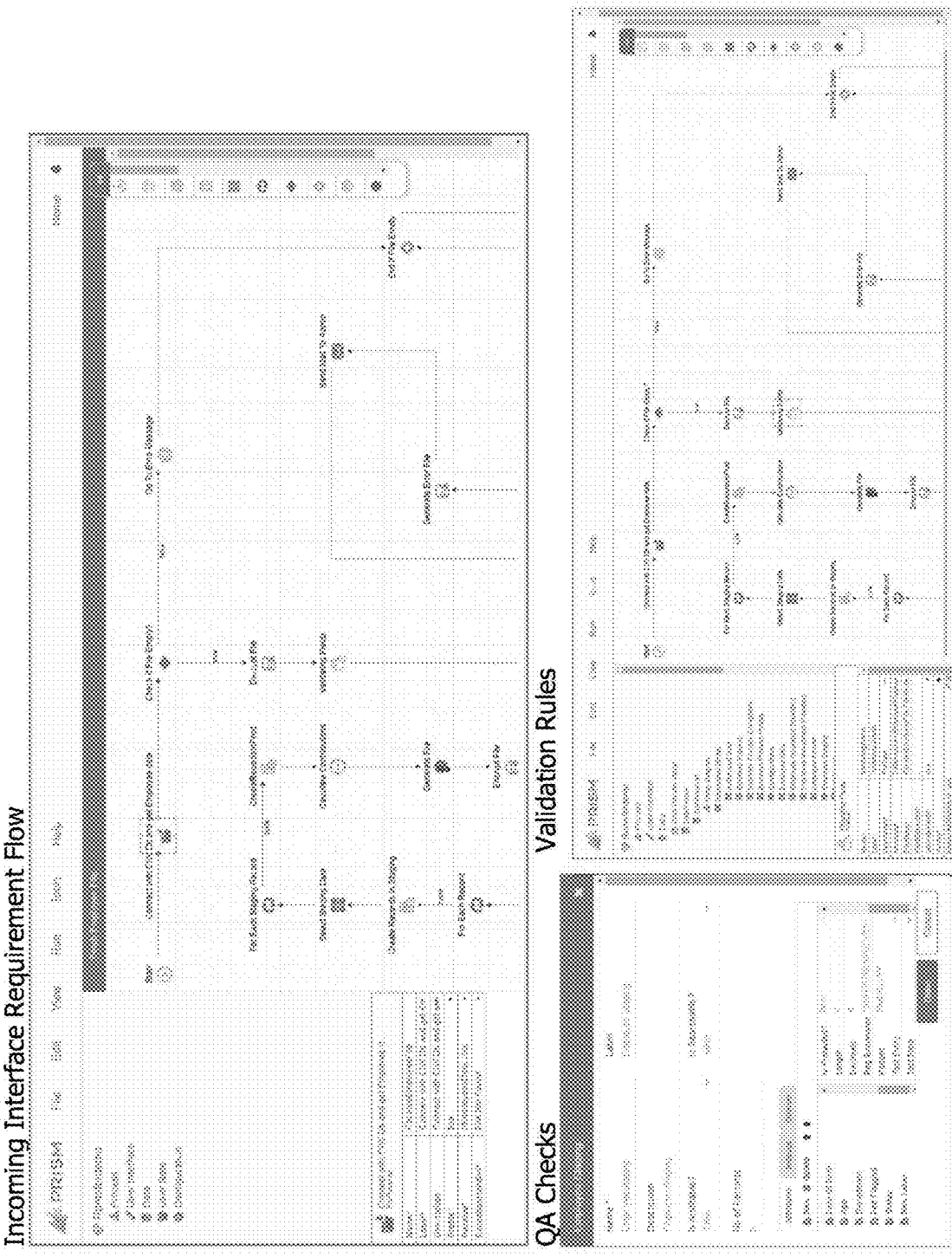
Fig. 14A PRSIM Example: Requirement Flow for Incoming Interface

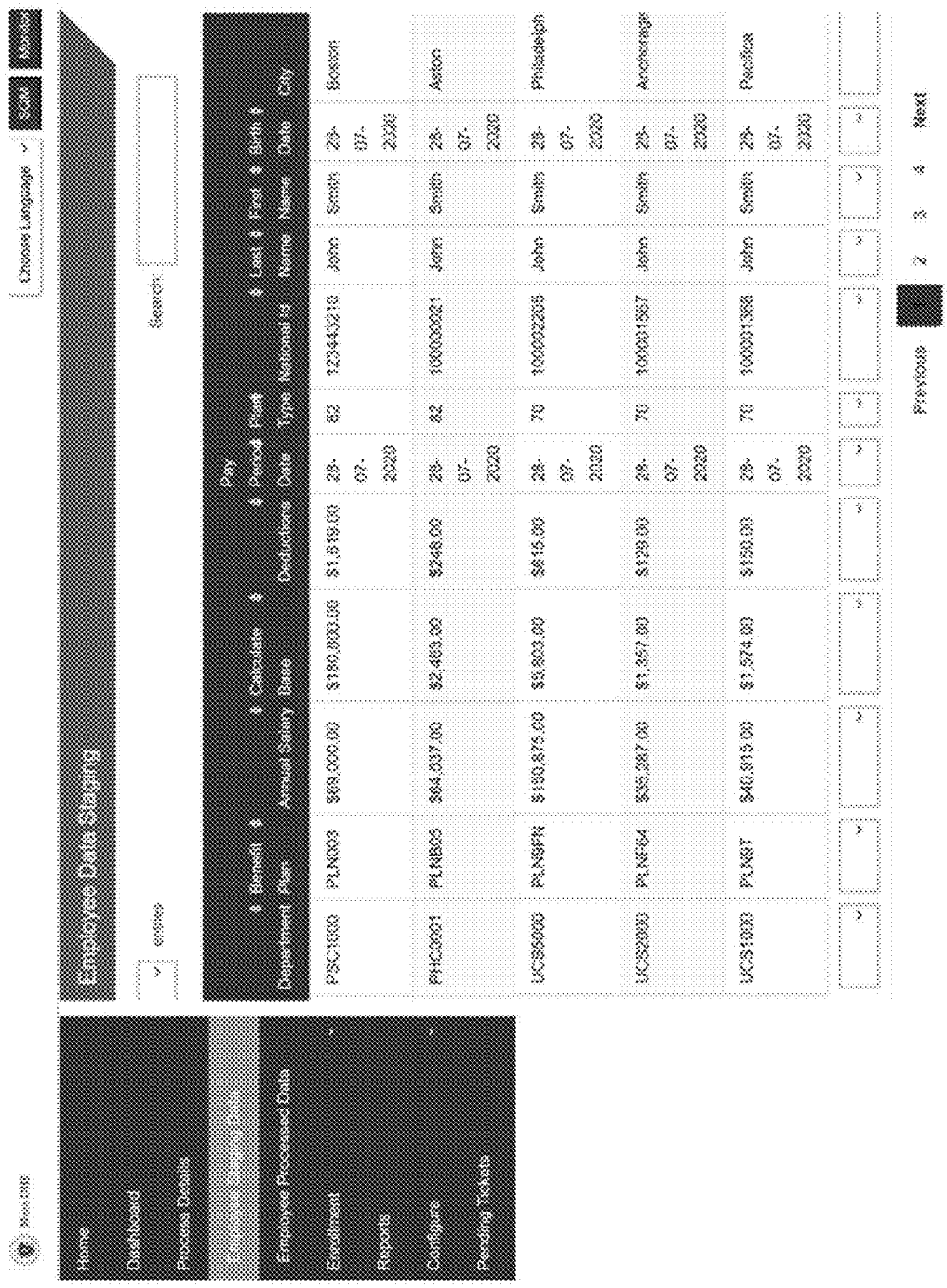
Fig. 14B PRISM Example: Generated Application Screen

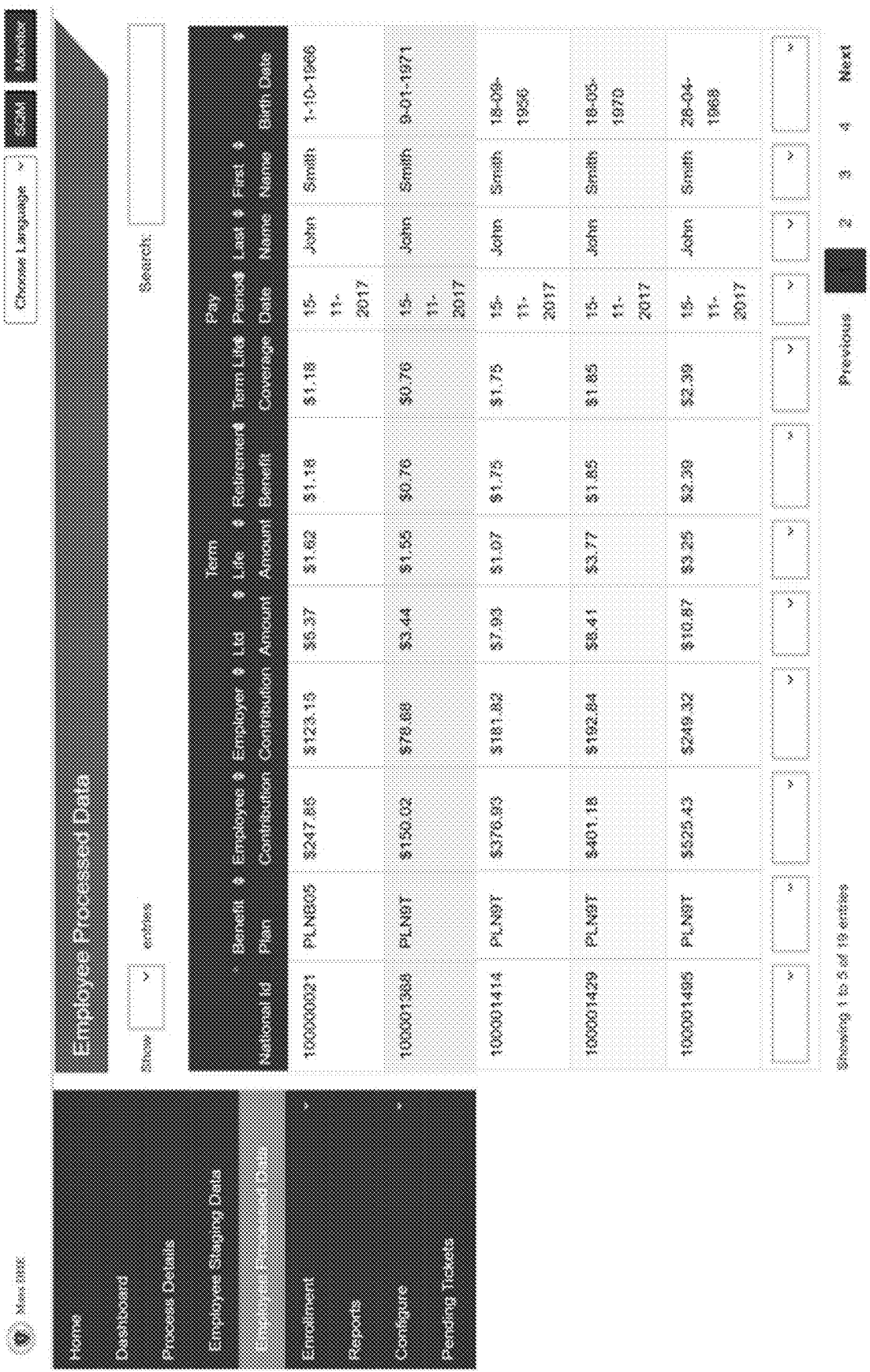
Fig. 14C PRISM Example: Generated Application Screen

SYSTEM AND METHOD FOR AUTOMATED SOFTWARE DEVELOPMENT THROUGH AI BASED AUTOMATED REQUIREMENTS

CROSS REFERENCE TO RELATED U.S. APPLICATION

This application claims the benefit of priority of U.S. Provisional Application No. 63/116,407 filed on Nov. 20, 2020, which is herein incorporated in its entirety.

TECHNICAL FIELD

The present disclosure relates to automation of software application development. In particular, the application relates to a computer system and method for a tractable, model-driven automated gathering of requirements for a software application, and the automated design and generation of a complete software application from the gathered requirements models including the automated design of a persistent data layer.

Background

Software development has undergone significant changes over the last several decades. However, even with the many improvements in methodology and platforms, fundamental issues such as time to market, flexibility to address future changes in business needs, the ability to cope with rapid changes in technology environments, and the availability of skilled resources remain. And now a new dimension is that of intelligence acquisition using machine learning. The most common cause for such failures has been requirements gathering. Many software projects still fail to achieve business outcomes because of weak or inadequate understanding of requirements.

Requirements gathering today is a highly manual and cumbersome effort using word processing, spreadsheet and flowcharting software. The end product is a document which has to be understood by technologists and translated to developers who then design and program the software application using a programming language like java. It is common practice these days to use programming frameworks and open source software to accelerate the development effort. Despite these accelerators and the maturity of programming languages, software application development still takes time and highly specialized skills.

Packaged applications which encapsulate requirements for a specific purpose, e.g., ERP applications like Salesforce, Workday, SAP and Oracle, have required significant customization and have not provided the flexibility to be used out of the box. Customizations require extensive programming and often take an inordinate amount of time and cost. There have also been significant gaps between such applications and the way enterprises run their business. They have succeeded only partially in capturing requirements and more critically, being able to accommodate the unique needs of each customer or user.

This is also true of the large number of Business Process Management [BPM] software offering Case Management Frameworks [CMFs]. They are however only capable of supporting the case workflow and not the inherent case work. Because of this none have been able to effectively address the basic issues of flexibility and time to market issues in the associated application development efforts. Invariably, given the coarse-grained support for Business Process by all the current BPM platforms, implementation of the full project typically involves a high degree of conventional programming. Of course, the result is a long implementation cycle and inflexibility.

Over the last decade, agile methodologies have gained adoption. All Agile methodologies, loosely speaking, are shorter versions of a typical software development methodology described later in this disclosure. Agile methodologies are directly a result of the frustration that requirements capture in a more expansive traditional approach ["waterfall"] takes so long and often falls significantly short that the resulting software application fails to meet business needs. They have emerged to address the frequent change and imprecise nature of requirements. To address such variability in the process and to reduce the costs of discovering gaps substantially downstream from the current step, Agile methods advocate shorter iterations and emphasize less focus on static steps like documentation. However, agile does not result in a shorter development lifecycle compared to traditional waterfall approaches. Agile does not equal agility.

More recently, Low Code and No code platforms have gained significant traction. Gartner defines a low-code application platform [LCAP] as a platform that supports rapid application development, one-step deployment, execution and management using declarative, high-level programming abstractions, such as model-driven and metadata-based programjing languages. They support the development of user interfaces, business logic and data services, and improve productivity at the expense of portability across vendors, as compared with conventional application platforms. Srinivasan et al [U.S. Pat. No. 8,015,541] disclosed a model-only application development platform which did not forward engineer its models into code.

In all these platforms, requirements are gathered manually. These platforms speed up software development once requirements are at hand and in the case of U.S. Pat. No. 8,015,541, even attempt to substitute programming and knowledge of programming skills with modeling using abstract components. However, none of these platforms attempt to automate requirements gathering. Requirements gathering continues to be the Achilles heel of software development.

It is clear therefore that there is a need for an efficient, accurate, flexible and rapid approach for gathering requirements without technical design expertise or knowledge for the purpose of automatically converting such requirements into a software application, including of course the design of the application and its persistent data model. This will enable near real time software development and unleash significant innovation and creativity in the use of technology for business and social benefit.

SUMMARY OF THE DISCLOSURE

A system and method are disclosed for an AI-based Automated Software Application Development Platform which intelligently gathers requirements from a business analyst and generates a runnable software application from those requirements. The AI-based platform enables the business analyst with no technical knowledge including any programming knowledge or skill to visually model their requirements rapidly without requiring any programming or scripting using its machine actionable abstract requirements model architecture. Using the abstract requirements architecture and assisted by the platform, the analyst creates requirements models for the application's business processes, business tasks for each of the processes including defining the its underlying information needs. The system intelligently assists the user in defining the information needs for each of the business processes and their tasks. All the requirements models are stored as data based on the system's machine actionable abstract requirements architecture.

Once the requirements models are created by the analyst with the help of the platform, the platform automatically designs and creates an appropriate persistent canonical data model for the application from the defined information needs. The platform then creates a runnable software application from the requirements models for the target deployment environments like a desktop or a mobile device or a set of APIs, in a programming language of choice like java and to be deployed different physical environments including the public or private cloud.

The system's software development intelligence is based on expert intelligence derived from experience in extensive and large scale software development combined with intelligence acquired using machine learning to learn new requirements models from real world applications developed using the platform.

BRIEF DESCRIPTION OF DRAWINGS

FIG. 1 illustrates a conventional Software Development Lifecycle

FIG. 2 illustrates an Agile Lifecycle

FIG. 3 illustrates the Software Development Lifecycle in the current invention FIG. 4 details the Prism Requirements Model Architecture for any Software Application FIG. 5 illustrates the creation of an AI-driven Requirements Model in Prism FIGS. 6A-C outlines the high level architecture for the Prism platform FIG. 7 details the Prism abstract requirements tasks FIG. 8 illustrates a Prism requirement model example for a Compute task FIGS. 9A-C illustrates a Prism requirement model example for an Incoming System to System Interface business process FIG. 10 specifies the Prism Information Model that underlies every business process and/or business task FIG. 11 shows the Prism Designer that the analyst uses to model requirements FIGS. 12A-B outlines an illustrative set of business process types that are typically a part of a software application FIG. 13 illustrates an example of the automated conversion of an information model into a canonical relational data model FIGS. 14A-C shows an exerpt from a software application automatically generated by Prism from requirements modeled using Prism

DETAILED DESCRIPTION OF ILLUSTRATIVE EMBODIMENTS

Background

Technology has long held out the promise of facilitating more efficient and flexible ways of doing business and enabling social development. Historically, however, any large enterprise abounds with business executives who are deeply frustrated with the inability of technology to keep up with their demands. Technologists blame shifting requirements and business leaders express their frustration on the inability of technology to keep up with changes in their needs. All the progress in programming languages, frameworks, architectures and methodologies have not really addressed the challenges associated with the cumbersome, time consuming and inaccurate process of gathering requirements. Lack of accurate and timely requirements is cited as the most frequent cause of delays and failure in software development. Largely as a result of the lack of rapid and accurate requirements, fundamental issues such as time to market, the need to cope with the rapid changes in technology environments and standards, and the availability of skilled resources remain as challenges in software development.

Software Development Methodologies

Software development lifecycle [SDLC] has evolved from an idiosyncratic art to an engineering discipline. The days of learning the art from a master craftsman have given away to structure, standards and the disciplines akin to engineering science. A conventional software development lifecycle is depicted in FIG. 1. An SDLC consists of many stages as an idea gets converted into a software application. At each stage, output from the previous stage is translated to serve the purpose and audience of the current stage. These intermediate translations are necessary so that ultimately we can produce a translation capable of being acted on by a computer. With each translation, we struggle to preserve full information and knowledge from the previous stage. Obviously, each stage adds precious time to the overall lifecycle. Some of the stages require specialized skills like programming.

Over the years, there has been a substantial amount of effort in making the SDLC effective and predictable. Such efforts can be classified into two major categories:

Methodological approaches aimed at improving the communication and translation between the various stages of the lifecycle by standardizing them and at reducing the redundancies across application development efforts Automation approaches aimed at automating one or more stages of the cycle The focus of methodological approaches has been to evolve the SDLC to an engineering science to increase the predictability and reliability of software development, in general. However, these approaches have largely not addressed the time to market and flexibility issues. This is because they have assumed the forward engineering oriented SDLC as given.

More recently, agile methodologies appear to be gaining adoption. All Agile methodologies, loosely speaking, are shorter versions of the above contemporary methodology described in FIG. 1. They have largely resulted from the realization that requirements change often and are not precise often. To address such variability in the process and to reduce the costs of discovering gaps substantially downstream from the current step, Agile methods advocate shorter iterations and emphasize less focus on static steps like documentation.

FIG. 2 illustrates a generic Agile methodology. Frequent iterations are at the heart of all Agile methodologies. Agile projects start with a release planning phrase followed by several iterations, each of which concludes with user acceptance testing. When the product meets minimally viable set of functionality, it is released. Users write 'user stories' to describe the desired functionality. Such stories form the requirements used to estimate project execution. Execution is divided into as many iterations as necessary. Users are allowed to add more detail to their stories even when iterations are in progress. The incremental changes are accommodated in the next iteration. At the end of each iteration, users test the application and bugs are simply made part of the next iteration. The users can decide at any time to release the software if enough functionality is available.

As is obvious, this is a shorter version of the contemporary methodology defined in FIG. 1. Important philosophical differences are the recognition that requirements are not static, and that steps like complete requirements documentation are unnecessary and drag the process down. Agile's success is dependent on having the requirements expert on hand all the time. This is because user stories are envisioned to be very brief. The methodology relies on the expert more and less on documentation. Thus, in the case of Agile, requirements are still gathered manually.

Agile methodologies, despite what might be construed from the name, do not result in any significant reduction in time to market or provide ongoing flexibility. In fact, as with anything new, we see significant misunderstanding of what Agile methodologies will accomplish. Agile methodologies should significantly increase the probability of acceptance by the users since the users will be seeing small pieces of the application frequently and will have the opportunity to make modifications all along the way. If there is a real subject matter expert at the helm, it is likely that there will be a minor reduction in time to market compared to a conventional SDLC. More often than not, we find that agile methods will increase the time to develop an application.

Despite various methodological advances in software development, the rate of failure, huge cost overruns and the frustration amongst business leaders continues to be unacceptably high.

Low Code and No Code Platforms More recently, Low Code and No code platforms have gained significant traction. Low code is a visual development approach to application development that enables professional and nonprofessional developers to collaborate and rapidly build and deploy applications. Gartner defines a low-code application platform [LCAP] as a platform that supports rapid application development, one-step deployment, execution and management using declarative, high-level programming abstractions, such as model-driven and metadata-based programming languages. They support the development of user interfaces, business logic and data services, and improve productivity at the expense of portability across vendors, as compared with conventional application platforms. According to Gartner, "By 2024, low-code application development will be responsible for more than 65% of application development activity." 1

An enterprise LCAP supports enterprise-class applications. These require high performance, scalability, high availability, disaster recovery, security, SLAs, resource use tracking, technical support from the provider, and API access to and from local and cloud services. Gartner views "no-code" application platforms as part of the LCAP market. "No-code" is a marketing and positioning statement, implying that the platform requires text entry only for formulas or simple expressions, all other aspects of application development being enabled by visual modeling or configuration. The LCAP market includes such no-code platforms.

Almost all the LCAP platforms forward engineer the final application as code. No-code in these platforms imply that the visual implementation models did not require any conventional programming. However, they do require programming skills and have to be used by developers.

Srinivasan et al [U.S. Pat. No. 8,015,541] disclosed a model-only no-code application development platform which did not forward engineer its models into code. The invention in U.S. Pat. No. 8,015,541 disclosed a system, method and computer program that provided an application development platform comprising a visual modeling environment enabling an application designer to model business applications, a set of pre-built components and application frameworks, a functionality enabling the integration of external components and/or programs and a business process runtime engine capable of executing the business processes and/or the application modeled by the application designer. The visual modeling environment allowed the application designer to implement an application's requirements in a flowchart like manner using pre-built components.

According to the disclosure, an application designer implements a business process by modeling the process flow requirements using the visual modeling environment including selecting appropriate components for the tasks and logically connecting them with each other. The business process runtime engine executes the implemented models i.e. runs the models implemented using the visual modeling environment. Like the other low code and no code platforms, this invention assumes that requirements are known and the application has been designed by a human architect. Srinivasan did not disclose a platform which can automate the gathering of business requirements or automate the design of the application data model. The application designer modeled on top of the application data model which of course can only be done once the requirements are known and a technologist has designed an appropriate application data model. Here is an excerpt from the disclosure-" . . . . Referring primarily to FIG. 2, the software development lifecycle in accordance with the preferred embodiment of the present invention is hereinafter described in detail. In this lifecycle, the first stage involves the translation of an idea into business requirements. The business requirements are documented in terms of the business processes that need to be supported by the application." [Col 7:61-67].

Current Invention

FIG. 1 describes a conventional software development lifecycle [SDLC]. The conventional SDLC consists of many stages as an idea gets converted into a software application. At each stage, output from the previous stage is translated to serve the purpose and audience of the current stage. In FIG. 1, the first step 110 involves the translation of an idea into business requirements by a business analyst 110. This is usually in the form of a word document, spreadsheets, or flowcharts. The second step 120 involves the translation of these requirements into technical requirements by a technologist 130 again in the form of a digital document(s). Technical requirements are then translated to a technical design 140 in step 3 by a technologist 150 which the developers can use. The application developers 185 then code the application 180 in accordance with the technical design 140. Simultaneously with coding, a parallel step is initiated to design an appropriate test strategy 160 which is done by a testing expert 170. Automated test scripts 187 are then built in accordance with the test strategy 160 by specialized developers 188. Once the application 180 is built, it is then tested 190 for technical defects. Once the application is free of technical defects, it is then subjected to user acceptance testing 195.

The conventional SDLC is slow, cumbersome and prone to delay. Each of the steps in the SDLC in FIG. 1 is an incremental translation in order to transform business requirements into a form that can be executed by a computer.

Based on several decades of experience with the conventional SDLC, the agile methodology was introduced in an effort to improve the probability that the final application will serve the needs of the business user. FIG. 2 illustrates a typical Agile lifecycle. Requirements are broken down into short user stories 210. User stories are then fed into a release planning 220 step and prioritized. The application build is then initiated manually as shown in steps 225 and 227. Each incremental release is tested 240 and the release is completed 250. The concept underlying agile lifecycle is with frequent and iterative review of small user stories, we can prevent the issues with a long 'waterfall' like lifecycle. Note that in an agile lifecycle in FIG. 2 as in the waterfall lifecycle illustrated in FIG. 1, requirements are described manually by a human in a static, digital document like word, spreadsheets or flowcharts.

FIG. 3 illustrates the software development lifecycle according to the preferred embodiment of this invention Hereinafter referred to as "Prism". Business requirements 300 are modeled by a business analyst 305 with the assistance of Prism 307. In this lifecycle, business requirements are no longer static digital documents, they are actionable models. The AI-driven intelligence in Prism (Requirements Assistant) enables the business analyst 300 to specify their needs using its abstract requirements model architecture to be described later. Once the requirements models 300 are complete, Prism automatically generates the technical design 310 for the application including an appropriate data model. Prism automatically generates the application 320 based on the requirements models 300 and the technical design 310. The Prism lifecycle in FIG. 3 is dramatically shorter compared to FIG. 1 and FIG. 2. Requirements are elicited and modeled by the business analyst 300 using an AI-based requirements model architecture in Prism 307. Ongoing changes can be immediately implemented using the same lifecycle. The Prism lifecycle detailed in FIG. 3 can enable a near real time software application development lifecycle.

FIG. 4 outlines the Prism platform at a very high level. The Business Analyst 400 works through the Prism Designer application 405 to model and build applications in Prism. The Business Analyst 400 models requirements models using the Prism Designer application 405. These requirements models are stored in the Requirement Models repository or database 415. The Prism Require AI Engine 410 assists the business analyst 400 in specifying requirements using its abstract business processes 420 and abstract business tasks 425. It will also have Reusable Requirements 430 which are complete applications and can be integrated as sub-applications in the current application the analyst 400 is building. Examples can be case management and role based access. In the case of an enterprise setting, there can be common functionality across multiple applications which can be set up as Reusable Requirements. These Reusable Requirements is that they are all in the form of requirements models.

The Prism Architect 435 automatically designs the application from the requirements and information models. It auto generates an appropriate canonical data model that is suitable to the information model and business process requirements. As an illustrative embodiment, this can be a relational data model or a graph data model or it could be a file system. The Prism Architect 435 also converts the requirements models 415 into an implementation version using low level Prism components. These models and the data model are useful if a human architect desires to review them and potentially make modifications. The Prism Application Generator 445 generates a complete application as Production Ready Executable Code 450 based on the requirements models 415, and the implementation models and the data model generated by the Prism Architect 435. The generated application is ready to deploy on the cloud or on an in-house environment and can be in any or multiple form factors—web application 455, mobile application/tablet application 460 and it can also be a set of APIs (Application Programming Interface) 465 which are to be invoked by another application. APIs will be compatible with standard API registry products.

FIG. 5 describes the AI-driven requirements elicitation process in Prism. The analyst 500 begins by defining a set of application objectives. Most software development efforts do not explicitly identify the main objectives behind the development effort and how their achievements will be measured. The objectives are then mapped to business processes that represent the functional detail of the process which will realize the objective. For e.g., an end to end automated loan approval process is a business process which could be attached to an objective to 'grant loans'. Once the objectives are mapped to a business process, the next step is to define the details of that process. The analyst 500 then selects a Process Type 330 from a list of options presented by Prism. The Prism Engine then guides the user in specifying the requirements for the process according to the process type chosen. Once process level information model are defined, the analyst is guided through completion of the business tasks for the process. Prism makes intelligent suggestions for the next business task in the process based on the tasks chosen thus far in the process. Prism also completes as much of the task related information as it can to minimize the modeling effort on the part of the analyst. Note that the analyst 500 has complete freedom to model the process the way they need to and ignore all Prism assisted suggestions. FIG. 12 discloses later in this disclosure a set of abstract processes for which Prism has built in intelligence.

The business analyst 305 creates requirements models 300 with the help of an AI-driven requirements model architecture which converts an otherwise static document into a machine actionable model. The requirements model architecture is shown in detail in FIG. 6a-6c. FIG. 6a outlines the overall application level requirements model architecture. All applications modeled and built using Prism can have explicit objectives that the analyst wants to achieve and map them to metrics that can provide a measure of how well those objectives are being achieved. Prism allows the analyst 600 to define a hierarchical set of objectives. In terms of the application requirements architecture, each objective is mapped to one or more business processes that will execute to achieve the objective. These business processes can be selected from a list of business process types in Prism. The business analyst can also decide to create a custom business process if none of the process types are suitable.

Prism includes an extensive set of business process types with default parameters, information model and process task trees. The parameter structure is flexible so administrators can add new parameters. The initial meta data for these abstract process types were defined using expert intelligence. Prism uses machine learning to discover modifications to existing process types and also identify new business process types and this is described later in this disclosure.

FIG. 6b provides further details of the requirements model architecture at the business process level. The process level requirements model for all Prism process types comprises three components: a set of process parameters, a process information model and a process task tree. Process parameters can be attributes like access, execution frequency, data based execution flags, desired throughput time, preferred execution time window constraints, and so on. The process information model is the application information the process needs to run. This is described later in this disclosure [FIG. 10]. The process task tree is the sequence of business tasks that form the business process. Prism contains default business task sequence for all the included process types. The analyst can of course alter the sequence to suit their specific needs.

FIG. 6c discloses the requirements model for a business task. All business tasks in Prism conform to the same requirements model structure with different task appropriate meta data. The structure includes three components-task parameters, task validation rules and the task information model. Task parameters are similar to Process parameters and contain attributes including task execution constraints like access, execution time, and execution window. The task information model contains the information needed for the task to run including input and output. Input is the information the task needs to run and output is the information the task should output to memory or database as the case may be. Prism includes an exhaustive set of business tasks with task intelligence referred to as abstract business tasks. [with attributes to have some further tie in to the database for action]

Prism includes an exhaustive list of abstract business tasks with associated intelligence as disclosed in FIG. 7. The business task modeled as part of a business process by an analyst is an instance of the abstract tasks disclosed in FIG. 7. The Prism Designer XXX shows all the tasks at the analyst's disposal. When the analyst completes the modeling of a Prism Business Task, it will get added to the process execution sequence tree and the Prism engine will determine if the next tasks should be presented. Each of the tasks is described below briefly.

Application Level
    O Objectives. Analysts can specify objectives for the application. Most applications, will have several objectives which they might seek to measure through explicit metrics, often referred to as Key Performance Indicators [KPIs]
    IM Information Model. The Information Model is a listing of all the information that is envisioned at the process and task levels. It also contains a few underlyng business attributes which enable Prism Architect to design the appropriate persistent data model. Note at the requirements stage, there will not be a data model for a new application. The information model is designed not to require a business analyst to have technical design competence.

Business Processes
    Int I Incoming Interface. This process contains intelligence for a generic incoming interface process. Analysts can use this and modify the process as they need.
    Int O Outgoing Interface. Similar to incoming interface but for an outgoing interface
    P Custom Process component. Enables the analyst to specify requirements for a new business process. Allows the analyst to select one of Prism's abstract process types or create a custom process
    UI P User interface process. This process contains the intelligence for a generic user interface process which contains 1 UI screen.

Business Tasks
    CO Compute component. Many processes require a computational task to perform some mathematical or logical computations on input data. The compute component lets the analyst specify computations in business terms and contains a number of attributes including rounding, range boundaries, string operations.
    CT Connector Component. The connector component enables the specification of a task requiring connectivity between systems. No technical knowledge is required of the analyst in providing the specifications.
    BR Business Rule. The Business Rule component enables the analyst to specify a rule using the information model for the process.
    UI User Interface. The User Interface component enables the analyst to design user interfaces for the application. Prism can incorporate style sheets. Anything else?
    DT Decision Tree—enables the analyst to model a scenario where a set of business rules are to be chained in a causal or sequential or hybrid manner.
    COL Data Collections—enables the specification of more than a single row of data to gathered and processed.
    EXT Extractor—extracts various items of interest from semi-structured or unstructured documents. This can be tables, data embedded in text, images and/or text.
    OPT Combinatorial Optimization—enables the specification of a optimization need across multiple assets with interplacy and dependencies across them. Prism has implemented a 2-stage heuristic which provides improved optimization results over commercial products. Analyst can also leverage commercial optimization products.
    NLU Natural Language Understanding—enables the specification of natural language understanding from text documents. This component relies on a $3^{rd}$ party technology for doing the actual processing of natural language documents.
    SML Statistical Machine Learning—enables the specification of statistical machine learning needs. This component relies on a $3^{rd}$ party statistical package called R.
    MAIL Ingest/Generate mail through email applications including Microsoft Outlook and Gmail.

Flow Tasks
    Arrow Allows the analyst to move the various tasks and other objects on the flow chart
    Line Allows the analyst to connect a task to another. It can have a Yes/No/Multivalued outcome property
    Loop Enables the analyst to indicate that a certain set of tasks have to be performed over more than one row
    Annotation Allows the analyst to annotate the requirements model flows with comments New abstract items can be added to Prism over time in each of the 4 layers above. Persons skilled in the art can easily create new business processes/tasks/flow tools that may be required in different industries and for different scenarios and add them to the palette. A new business task can also be suggested by Prism by inferring it from its process intelligence.

FIG. 8 illustrates a Prism requirement model example for a Compute task 800. A Compute task 800 in Prism can contain more than one computation specification 805. These computations can be related to each other. The business analyst can break up a complex computation into multiple steps as needed. The scope of a computation's mathematical expression 825 can contain any information model item 830, use some numerical or text functions 835 like sum, average and use any relational operator 840. The Prism AI Engine will convert these compute requirements into its design for the application automatically.

FIG. 9*a-b* illustrates an Prism abstract and actual requirement model example for an Incoming System to System Interface business process. Prism uses inbuilt intelligence and the abstract requirement model in FIG. 9*a* to guide the analyst in their modeling of the actual requirement model for the incoming interface (FIG. 9*b*). The analyst can use this complete model as is, modify it as necessary or build a custom version completely from scratch using the Prism abstract business tasks. The abstract requirement model begins with a task for defining input data 900. It consists of defining the associated information model 902 and specifying a set of configuration parameters 905. Configuration parameters 905 can include validation rules by type of data item expected in the information model, size of the incoming file, periodicity, and source location information. The abstract requirement model in Prism expects the next task to be to retrieve the file 908 from the source location. If the file is not found 910, then Prism model allows for 3 retries. The business analyst can of course edit all such configuration parameters, for example, set the number of retries to 2. If the retries still do not find the file, then Prism requirement model illustrates a set of notification tasks 915, 918. Once the file is found, Prism illustrates the next task of loading the file 920 for processing. Similar to finding the file, again the model has tasks for escalation [922,925] if the loading task fails. The requirement model has validation tasks after loading—928, 935 with escalation tasks [930, 932] if any of the validation fails. Finally, the requirement model allows for selectively saving the processed data in the application data base with the Mapping for Save task 938. FIG. 9*b* illustrates the actual requirements model for a real application modele with the help of Prism. FIG. 9*c* illustrates the information model for the process in FIG. 9*b*.

FIG. 10 details the Prism Information Model that underlies every business process and/or business task. It is a flexible structure giving it the ability to adapt to varied needs of processes and tasks. Prism AI Engine enables two variations of the Information Model-one for input 1000 and the other for output 1010. This is to declare some transient information that need not be stored. The Prism AI Engine can discard it when it processes the specifications and generates the design.

FIG. 11 shows the Prism Designer that the analyst uses to model requirements. The business analyst can model one or more applications using the Designer 1140. All these application models are displayed and accessed through the Designer Browser 1110. The Prism Designer 1140 interacts with the Prism Require AI Engine 1110. The Prism Require AI Engine 1110 retrieves the requirements models for business processes and tasks as needed based on the specific needs of the modeling efforts of the analyst. The abstract requirement models are stored in the Abstract Requirement Models Store 1120. Finally, all the models created by the analyst are stored in the Requirements Models data store 1130.

FIG. 12*a-b* outlines an illustrative set of business process types that are typically a part of a software application. The Process Type 1200 lists a set of illustrative enterprise process types that Prism contains intelligence on including typical process parameters, typical and process task trees. The Process Description 1205 describes these processes at a very high level. As mentioned before, intelligence on new process types can be added both by experts from their experience and/or learned using machine learning techniques.

FIG. 13 illustrates an example of the automated conversion of an information model into a canonical relational data model. We illustrate the conversion of an information model on employees 1300 described by a business analyst. Prism automatically generated the canonical data model 1305. The canonical data model 1305 captures the relationship implied by the analyst in the information model 1300. It comprises an Employee table 1310, Lists 1315 and Items 1320 tables, an Employee Tenure Table 1325 and an ORP Tenure Table 1330. Prism automatically inferred from the # of instances that there is an implied 1:m relationship between Employees and Employee Tenure. Similarly it inferred from the 'HardList' type that the values in that field will be only limited to the values in a reference list. Noticing that there were two implied lists, Prism generated Lists and Items tables which of course allows for changes to lists over time. The data model generator in Prism has built in intelligence on many aspects like Lists and Items.

FIG. 14*a-c* shows an excerpt from a software application automatically generated by Prism from requirements modeled using Prism. We are only illustrating a small portion of the application. FIG. 14*a* displays requirements models in Prism pertaining to an incoming interface. The three screenshots show the interface requirements process, another process which specifies validation rules to be applied and a third flow for quality assurance checks. These processes specify both the details of the incoming interface data and also how it should be processed and displayed to the user. In FIGS. 14*b-c*, we can see the corresponding data and display. The full application requirements are substantially larger containing tens of processes and hundreds of tasks. Prism generated the complete application corresponding to these requirements but we have not displayed it here for brevity.

Once the application requirements are complete, the completed models at the process and task level are used for enhancing the Prism intelligence though machine learning methods. Any machine learning technique may be used however we prefer the use of traceable techniques like tree based methods or markov chain. The completed models are saved to a Requirements Models repository.

What is claimed is:

1. A method for carrying out a task of automatically gathering tractable, model-driven data requirements and automatically developing computer executable code and converting the executable code into a fully operable software application from user input information specifying requirements for a software application comprising:
    a computer system with a user interface comprising at least one processor configured to carry out a task of automatically gathering tractable, model-driven requirements data and automatically developing a production ready executable code for a software application connected to an application designer component;
    an artificial intelligence (AI) engine component for automatically transforming the input information into machine language representation and creating requirement models for the software application;
    a component comprising a data repository for storing the created requirement models;
    a component to drive an artificial intelligence (AI) driven architecture process which automatically converts the requirement models into a machine actionable model using Prism requirements model architecture; and a component for automatically transforming the machine actionable model into production ready executable code and a runnable software application;

wherein the artificial intelligence (AI) engine processes information for a plurality of processes learnt from expert intelligence and machine learning processes and comprising a set of process parameters in the form of information needs, a process task tree, set of process execution sequence tree and Markov chain.

2. The method of claim 1 where the artificial intelligence (AI) engine contains task intelligence for a plurality of tasks which are used in a business process that are learnt from both expert intelligence and acquired intelligence machine learning comprising a set of task parameters in the form of information needs, a task meta data structure and set of task execution parameters.

3. The method of claim 1 where the artificial intelligence (AI) engine uses the AI-driven architecture process to interactively assist a user who has no technology, design or programming knowledge to define requirements models for the software application.

4. The method of claim 1 where the abstract requirements model architecture for a software application in the artificial intelligence (AI) engine comprises a plurality of application objectives and a plurality of tasks and a plurality of Key Performance Indicators (KPIs) corresponding to a business process.

5. The method of claim 1 wherein the artificial intelligence (AI) engine is configured to guide the user to model specified objectives for the software application with measurable Key Performance Indicators (KPIs) corresponding to the specified objectives.

6. The method of claim 1 where the specified objectives for the software application modeled by the user are mapped to a business process that define the functional detail of the business process software application to create a list of process types for the software application.

7. The method of claim 1 where the artificial intelligence (AI) engine assists the user to specify requirements to create a requirements model for the business process software application that includes required parameters for the business process and a process task tree comprising a plurality of tasks constituting the business process.

8. The method of claim 7, wherein the process task tree is a decision tree of business tasks where the next task in the tree at least partly depend on the previous task or the previous task's information model in the process task tree.

9. A natural language understanding system comprising a computer system having at least one processor configured carry out a task of automatically gathering tractable, model-driven requirements data and automatically developing a production ready executable code for a software application comprising:

a user interface component for accepting user input information specifying requirements for a software application which is connected to an application designer component;

a component comprising an artificial intelligence (AI) engine for automated transformation of the input information into machine language representation and creation of requirement models for the software application;

a component comprising a data repository for storing the created requirement models;

a component to drive an artificial intelligence (AI) driven architecture process which automatically converts the requirement models into a machine actionable model using Prism requirements model architecture; and a component for automatically transforming the machine actionable model into production ready executable code and a runnable software application;

wherein the artificial intelligence (AI) engine processes information for a plurality of processes learnt from expert intelligence and machine learning processes and comprising a set of process parameters in the form of information needs, a process task tree, set of process execution sequence tree and Markov chain.

10. The system of claim 9 where the artificial intelligence (AI) engine contains task intelligence for a plurality of tasks which are used in a business process that are learnt from both expert intelligence and acquired intelligence machine learning comprising a set of task parameters in the form of information needs, a task meta data structure and set of task execution parameters.

11. The system of claim 9 where the artificial intelligence (AI) engine uses the AI-driven architecture process to interactively assist a user who has no technology, design or programming knowledge to define requirements models for the software application.

12. The system of claim 9 where the abstract requirements model architecture for a software application in the artificial intelligence (AI) engine comprises a plurality of application objectives and a plurality of tasks and a plurality of Key Performance Indicators (KPIs) corresponding to a business process.

13. The system of claim 9 wherein the artificial intelligence (AI) engine is configured to guide the user to model specified objectives for the software application with measurable Key Performance Indicators (KPIs) corresponding to the specified objectives.

14. The system of claim 9 where the specified objectives for the software application modeled by the user are mapped to a business process that define the functional detail of the business process software application to create a list of process types for the software application.

15. The system of claim 9 where the artificial intelligence (AI) engine assists the user to specify requirements to create a requirements model for the business process software application that includes required parameters for the business process and a process task tree comprising a plurality of tasks constituting the business process.

16. The system of claim 15, wherein the process task tree is a decision tree of business tasks where the next task in the tree at least partly depend on the previous task or the previous task's information model in the process task tree.

17. The system of claim 15, wherein the tasks used to create the requirements model by the user are abstract business tasks that are a part of the artificial intelligence (AI) engine.

18. The system of claim 17, where the requirements models for processes and tasks include an information model required for executing the processes and tasks.

* * * * *